United States Patent
Magnuson et al.

(10) Patent No.: US 10,151,153 B2
(45) Date of Patent: Dec. 11, 2018

(54) INTERLOCK PIPE CONNECTION

(71) Applicant: Nabors Industries, Inc., Houston, TX (US)

(72) Inventors: Chris Magnuson, Houston, TX (US); Enrique Abarca, Houston, TX (US)

(73) Assignee: NABORS INDUSTRIES, INC., Houston, TX (US)

( * ) Notice: Subject to any disclaimer, the term of this patent is extended or adjusted under 35 U.S.C. 154(b) by 52 days.

(21) Appl. No.: 15/615,980

(22) Filed: Jun. 7, 2017

(65) Prior Publication Data
US 2017/0268298 A1 Sep. 21, 2017

Related U.S. Application Data

(62) Division of application No. 14/502,417, filed on Sep. 30, 2014, now Pat. No. 9,695,649.

(60) Provisional application No. 61/886,146, filed on Oct. 3, 2013.

(51) Int. Cl.
*E21B 17/042* (2006.01)
*E21B 17/046* (2006.01)
*E21B 17/043* (2006.01)
*F16L 37/244* (2006.01)
*F16L 15/00* (2006.01)
*F16L 15/08* (2006.01)
*F16L 15/06* (2006.01)

(52) U.S. Cl.
CPC .......... *E21B 17/042* (2013.01); *E21B 17/043* (2013.01); *E21B 17/046* (2013.01); *F16L 37/2445* (2013.01); *F16L 15/002* (2013.01); *F16L 15/06* (2013.01); *F16L 15/08* (2013.01)

(58) Field of Classification Search
CPC .... E21B 17/042; E21B 17/043; E21B 17/046; E21B 17/0423; F16L 19/005; F16L 37/2445; F16L 15/002
See application file for complete search history.

(56) References Cited

U.S. PATENT DOCUMENTS

| | | | | |
|---|---|---|---|---|
| 633,324 | A * | 9/1899 | Luke | F16L 33/24 |
| | | | | 285/40 |
| 1,507,877 | A * | 9/1924 | Wilson | E21B 17/042 |
| | | | | 285/391 |
| 1,539,287 | A * | 5/1925 | Wilson | E21B 17/042 |
| | | | | 285/333 |
| 1,605,314 | A * | 11/1926 | Wilson | E21B 17/042 |
| | | | | 285/391 |
| 1,614,815 | A * | 1/1927 | Wilson | E21B 17/042 |
| | | | | 285/27 |
| 1,932,427 | A * | 10/1933 | Stone | E21B 17/0423 |
| | | | | 285/148.1 |

(Continued)

*Primary Examiner* — Brad Harcourt
*Assistant Examiner* — Steven A MacDonald
(74) *Attorney, Agent, or Firm* — Adolph Locklar

(57) ABSTRACT

An interlock pipe joint includes a first and second tubular member. In some embodiments, an interrupted thread box and pin make up the interlock pipe joint. In other embodiments, a stepped interrupted thread box and pin make up the interlock pipe joint. In other embodiments, a twist-lock box and pin make up the interlock pipe joint. In some embodiments, an external or internal bushing is provided. In a method of operation, the first tubular member is inserted into the second tubular member by an axial insertion followed by a rotation to lock the pipe joint.

6 Claims, 10 Drawing Sheets

(56) References Cited

U.S. PATENT DOCUMENTS

| | | | | |
|---|---|---|---|---|
| 1,993,257 | A | * | 3/1935 | Bettis .................... E21B 17/042 |
| | | | | 285/116 |
| 4,426,105 | A | * | 1/1984 | Plaquin ................ E21B 17/043 |
| | | | | 285/3 |
| 5,318,570 | A | * | 6/1994 | Hood ................ A61B 17/8847 |
| | | | | 601/2 |
| 6,283,511 | B1 | * | 9/2001 | Kamp ................ F16L 37/2445 |
| | | | | 285/334.4 |
| 2007/0236015 | A1 | * | 10/2007 | Sugino ................ E21B 17/042 |
| | | | | 285/334 |

* cited by examiner

INTERLOCK PIPE CONNECTION

CROSS-REFERENCE TO RELATED APPLICATIONS

This application is a divisional application which claims priority from U.S. nonprovisional application Ser. No. 14/502,417, filed Sep. 30, 2014, which itself claims priority from U.S. provisional application No. 61/886,146, filed Oct. 3, 2013, each of which is hereby incorporated by reference in its entirety.

TECHNICAL FIELD/FIELD OF THE DISCLOSURE

The present disclosure relates to coupling lengths of pipe. The present disclosure relates particularly to coupling lengths of pipe used to make up a string for downhole applications.

BACKGROUND OF THE DISCLOSURE

In many stages of the drilling and completion of an oil and gas well, tubular members may be coupled end-to-end to form what is known as a string. For the purposes of this disclosure, the term "drill string" will be used to refer to any such string, including without limitation, drill strings, tool strings, casing strings, and completion strings. Typically, tubular members may be made up in approximately 30-90 foot segments, and include threaded couplings at each end. Commonly known as "box" and "pin" connections for the female and male portions, respectively, the threaded connections serve to both form a fluid seal between the tubular segments and to durably connect the adjacent tubulars.

When "making up" a drill string, multiple rotations of one of the tubulars may be required to fully engage the threads of the box with the threads of the pin. Generally, these rotations may be accomplished by use of a pipe spinner, a high speed, low torque device to quickly thread the tubular members together. After the tubulars have been connected with the low torque pipe spinner, mechanical tongs or iron roughnecks are typically used to apply high-torque to the joint to ensure a complete and durable connection by ensuring both shoulders of the box and pin fully engage. Similarly, when "breaking out" a drill string, mechanical tongs or iron roughnecks are used to provide the high torque required to initially separate the tubular segments, and a pipe spinner is used to quickly unthread the tubulars the rest of the way.

The amount of torque required to securely tighten the tubulars, known as make-up torque, may ensure the threaded connections do not separate while downhole. Such an unintended disconnection may result in costly and time-consuming "fishing" operations to retrieve the disconnected section of drill pipe, during which drilling operations must be suspended. Additionally, if excess make-up torque is applied, material yielding in the threaded connections may cause damage to the tubulars which may result in, for example, unintended separation downhole.

SUMMARY

The present disclosure provides for a pipe joint for use in joining tubular members. The pipe joint may include a box formed in an end of a first tubular member, the box formed in the interior surface of the first tubular member, the box including internal threads and internal lands, the internal threads positioned in radial segments and separated by the internal lands, the lands being generally cylindrical segments having inner diameter larger than the largest outer diameter of the largest thread. The pipe joint may also include a pin formed in an end of a second tubular member, the pin formed in the exterior surface of the second tubular member, the pin including external threads and external lands, the external threads positioned in radial segments and separated by the external lands, the lands being generally cylindrical segments having outer diameter smaller than the smallest outer diameter of the smallest thread. The widths and positions of the external threads of the pin may be positioned to correspond with those of the internal lands of the box, and the widths and positions of the external lands of the pin may be positioned to correspond with those of the internal threads of the box when the box is inserted into the pin. The external threads of the box and the internal threads of the pin may be positioned to mesh and tighten the box to the pin and provide a fluid seal between the first and second tubular member.

The present disclosure further provides for a pipe joint for use in joining tubular members. The pipe joint may include a box formed in an end of a first tubular member, the box formed in the interior surface of the first tubular member, the box including stepped internal threads and internal lands, the stepped internal threads positioned in radial segments, the stepped internal threads arranged in groups of a generally repeating pattern of thickness ascending order, the groups separated by the internal lands, the lands being generally cylindrical segments having inner diameter larger than the largest outer diameter of the largest thread. The pipe joint may also include a pin formed in an end of a second tubular member, the pin formed in the exterior surface of the second tubular member, the pin including stepped external threads and external lands, the stepped external threads positioned in radial segments, the stepped external threads arranged in groups of a generally repeating pattern of thickness ascending order, the groups separated by the external lands, the lands being generally cylindrical segments having outer diameter smaller than the smallest outer diameter of the smallest thread. The widths and positions of the largest stepped external threads of the pin may be positioned to correspond with those of the internal lands of the box, and the widths and positions of the external lands of the pin may be positioned to correspond with those of the largest stepped internal threads of the box when the box is inserted into the pin. The stepped external threads of the box and the stepped internal threads of the pin may be positioned to mesh and tighten the box to the pin and provide a fluid seal between the first and second tubular member.

The present disclosure further provides for a method of making up a pipe joint. The method may include providing a first tubular member, the first tubular member including a box formed in the interior surface of an end of the first tubular member, the box including internal threads and internal lands, the internal threads positioned in radial segments and separated by the internal lands, the lands being generally cylindrical segments having inner diameter larger than the largest outer diameter of the largest thread; providing a second tubular member, the second tubular member including a pin formed in the exterior surface of an end of the second tubular member, the pin including external threads and external lands, the external threads positioned in radial segments and separated by the external lands, the lands being generally cylindrical segments having outer diameter smaller than the smallest outer diameter of the smallest thread, the external threads of the box and the internal threads of the pin positioned to mesh; aligning the box and the pin so that the widths and positions of the external threads of the pin positioned to correspond with those of the internal lands of the box, and the widths and positions of the external lands of the pin positioned to correspond with those of the internal threads of the box; inserting the pin into the box; and rotating the pin.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
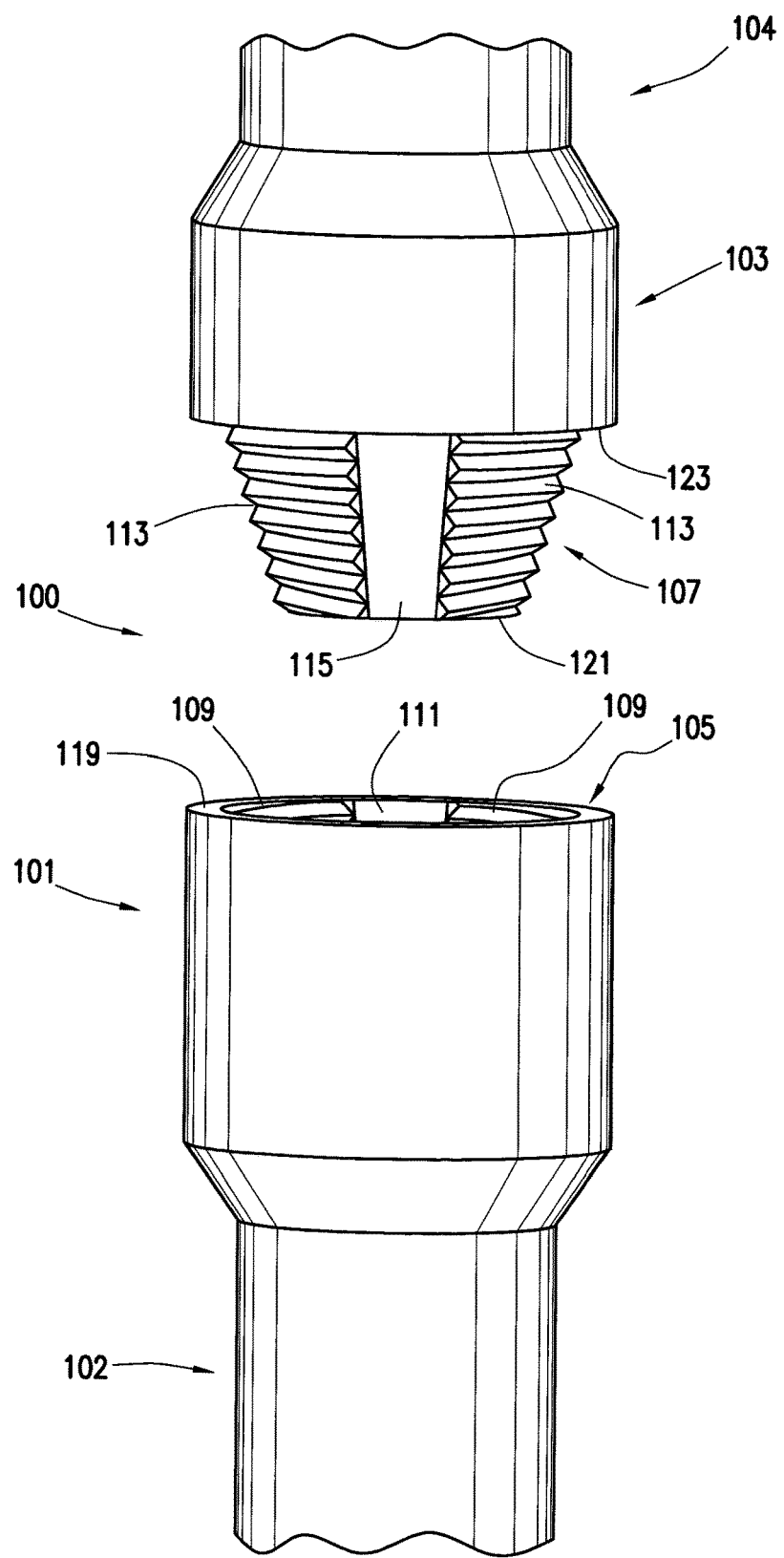
FIG. 1 is a perspective view of an interrupted thread box and pin connection consistent with embodiments of the present disclosure.
Figure 2:
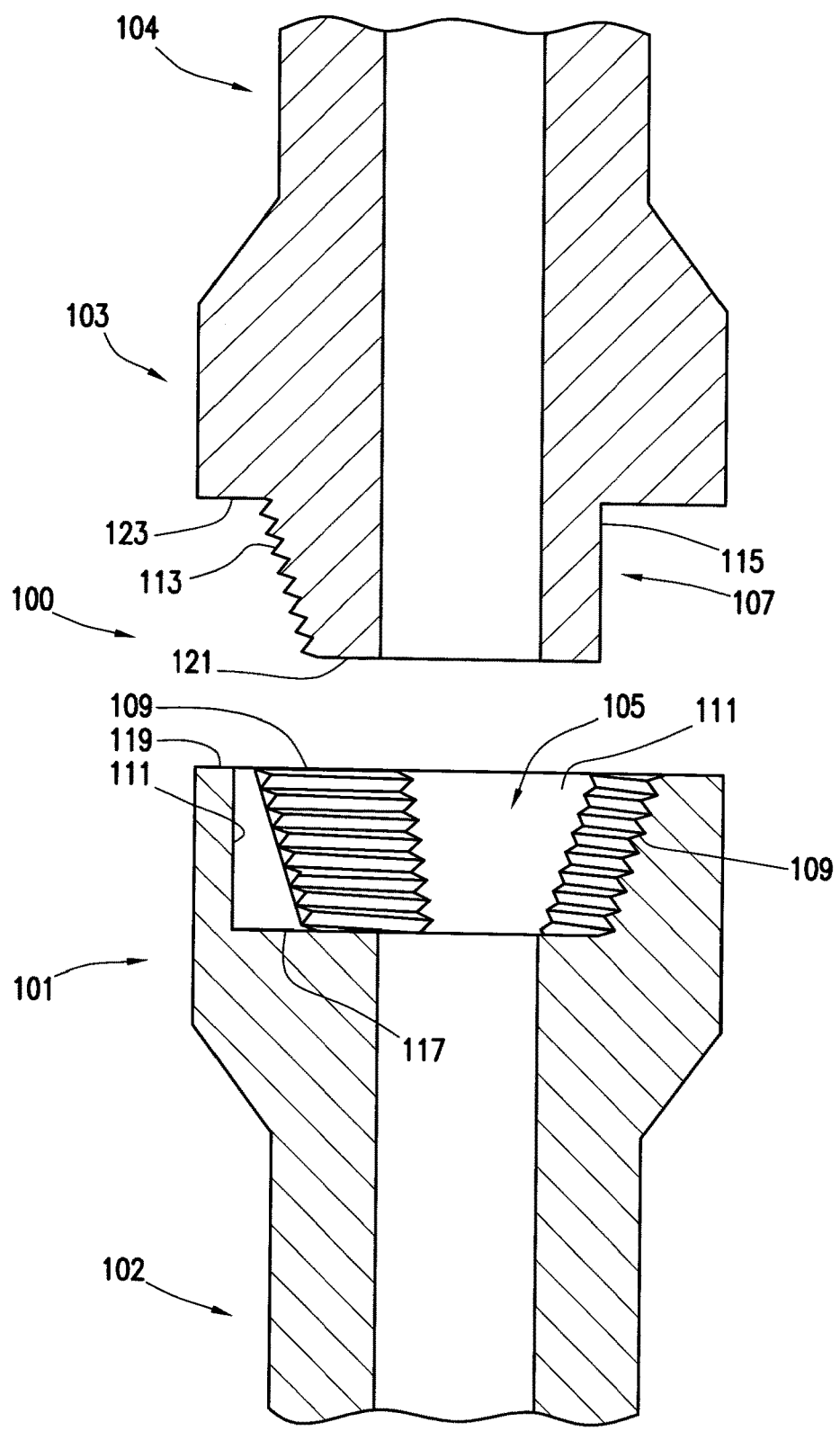
FIG. 2 is a cross-section view of the interrupted thread box and pin connection of FIG. 1.
Figure 3:
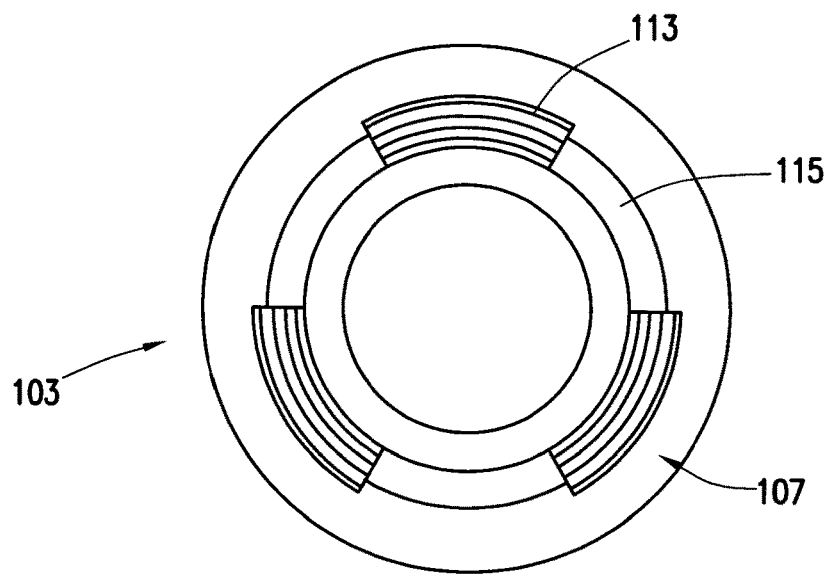
FIG. 3 is an elevation view of the interrupted thread pin of FIG. 1.
Figure 4:
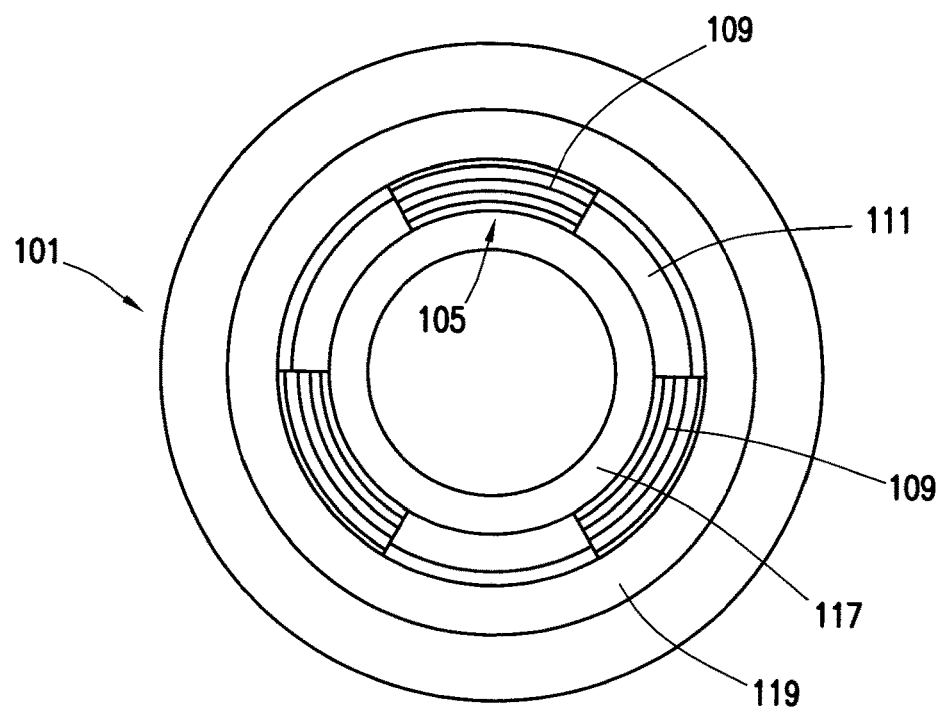
FIG. 4 is an elevation view of the interrupted thread box of FIG. 1.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In one embodiment of the present disclosure, an interrupted thread box and pin connection is described. As illustrated in FIGS. 1-4, an interrupted thread pipe joint 100 utilizes an interrupted thread box 101 and interrupted thread pin 103. Interrupted thread box 101 is formed as an end of a first tubular 102, and interrupted thread pin is formed as an end of a second tubular 104. Interrupted thread box 101 includes an inner mating surface 105 positioned to generally surround the outer mating surface 107 of interrupted thread pin 103. Inner mating surface 105 includes multiple radial segments, the radial segments alternating between box threads 109 and box lands 111. Likewise outer mating surface 107 includes multiple radial segments, the radial segments alternating between pin threads 113 and pin lands 115.

Box lands 111 may be configured to allow interrupted thread pin 103 to enter interrupted thread box 101 when pin threads 113 may be aligned with box lands 111. Likewise, pin lands 113 may be configured to allow interrupted thread pin 103 to enter interrupted thread box 101 when box threads 109 may be aligned with pin lands 115. Box threads 109 and pin threads 113 may be configured to threadedly mesh with each other in response to a rotation of either the interrupted thread pin or box 103, 101 once interrupted thread pin 103 is inserted into interrupted thread box.

As box threads 109 and pin threads 113 mesh and engage, interrupted thread box and pin 101, 103 are pulled together, and the inner and outer shoulders 117, 119 of interrupted thread box 101 contact and engage outer and inner shoulders 123, 121 of interrupted thread pin 103. Continued rotation causes shoulders 117 and 121 and shoulders 119 and 123 to be forced together thus establishing, for example, a fluid seal. Additionally, elastic deformation of shoulders 117, 119, 121, 123 create a normal force therebetween and on threads 109, 113 which provides friction to prevent the pipes from disconnecting until break out is desired.

In the embodiment depicted in FIGS. 1-4, interrupted thread box and pin 101, 103 include six radial segments, three each threads 109, 113 and lands 111, 115. Thus, in operation, interrupted thread pin 103 is aligned axially with interrupted thread box 101. Pin threads 113 may be aligned with box lands 111 (and therefore box threads 109 are aligned with pin lands 115). Interrupted thread pin 103 is then inserted into interrupted thread box 101. Interrupted thread pin 103 is rotated with respect to interrupted thread box 101 (or vice versa) so that pin threads 113 and box threads 109 engage, thus making up the interrupted thread joint 100. In a six-segment configuration as here depicted, a rotation of approximately ⅙ turn is required to seat interrupted thread joint 100. One having ordinary skill in the art with the benefit of this disclosure will understand that any number of thread segments and lands may be used within the constraints of, for example, pipe diameter, desired thread count and pitch, and make-up rotation.

Figure 6:
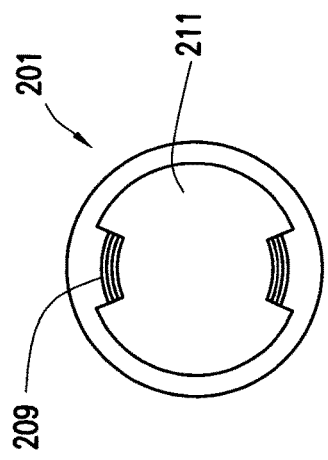
FIG. 6 is an elevation view of the box of FIG. 5.
Figure 7:
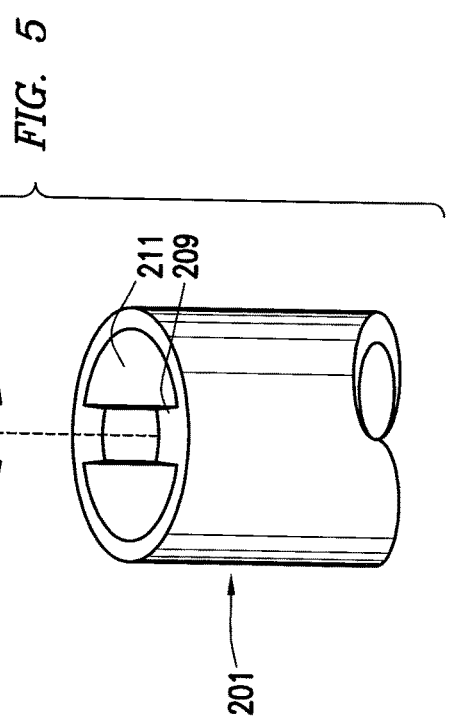
FIG. 7 is a partial cutaway view of the box of FIG. 5.
Figure 5:
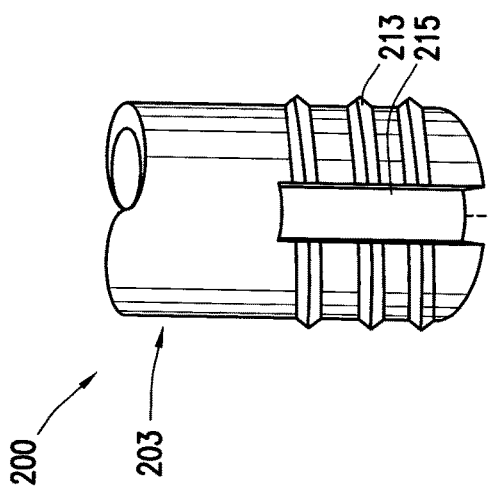
FIG. 5 is a perspective view of an alternate interrupted thread box and pin connection consistent with embodiments of the present disclosure.

Additionally, although depicted as being of equal width, threads 109, 113 and lands 111, 115 may be of different widths, as long as the widths of box threads and lands 109, 111 correspond with the widths of pin lands and threads 115, 113 respectively. For example, FIGS. 5-7 depict an interrupted thread joint 200 wherein the interrupted thread box 201 includes two box threads 209 which may be narrower than the pair of box lands 211. The corresponding interrupted thread pin 203 includes two correspondingly wide pin threads 213 interspersed by narrow pin lands 215.

In some embodiments, the number of thread starts may be the same as the number of thread segments, thus avoiding the need for specific alignment between interrupted thread box and pin 101, 103 before insertion.

Figure 8:
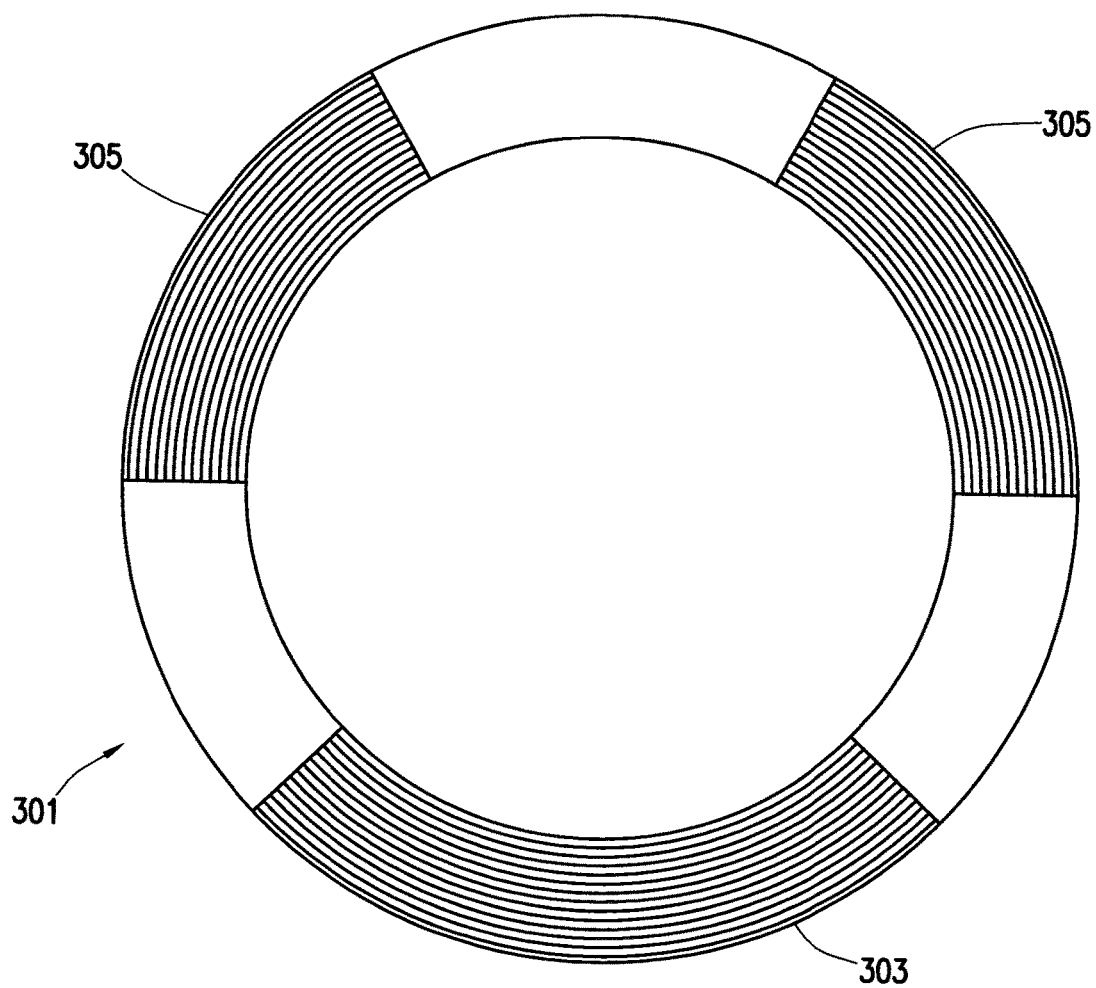
FIG. 8 is an elevation view of the end of an interrupted thread box having a wider threaded segment consistent with embodiments of the present disclosure

In an embodiment including a single-thread start, proper landing may only occur when interrupted thread box and pin 101, 103 may be inserted in a particular thread-and-land configuration. Otherwise, more than one partial rotation will be necessary to properly land interrupted thread joint 100 (e.g. a six-segment configuration would require more than a ⅙ rotation). To aid with alignment, one box thread segment may be formed wider than the other box thread segments, and one pin land may be correspondingly wider than the other pin lands. For example, FIG. 8 depicts an interrupted thread box 301 having wide threaded segment 303 and two narrow threaded segments 305. Therefore, a mating pin (not shown) would be able to interface with the interrupted thread box 301 in only a single radial orientation. Thus, the short (here, approximately ⅙ rotation) turn landing would be ensured.

In some embodiments, interrupted thread box and pin 101, 103 may be created from milling out portions of the threads of an existing traditional box and pin joint. In such an embodiment, each box and pin may be milled at the same point relative to the thread start to, for example, maximize the contact area between threads when interrupted thread joint 100 is fully seated. In such an embodiment, an interrupted thread box or pin 101, 103 could be used with a traditional box and pin joint. In other embodiments, a crossover sub could be used to mate an interrupted thread box or pin 101, 103 with a traditional box and pin joint.

Figure 9:
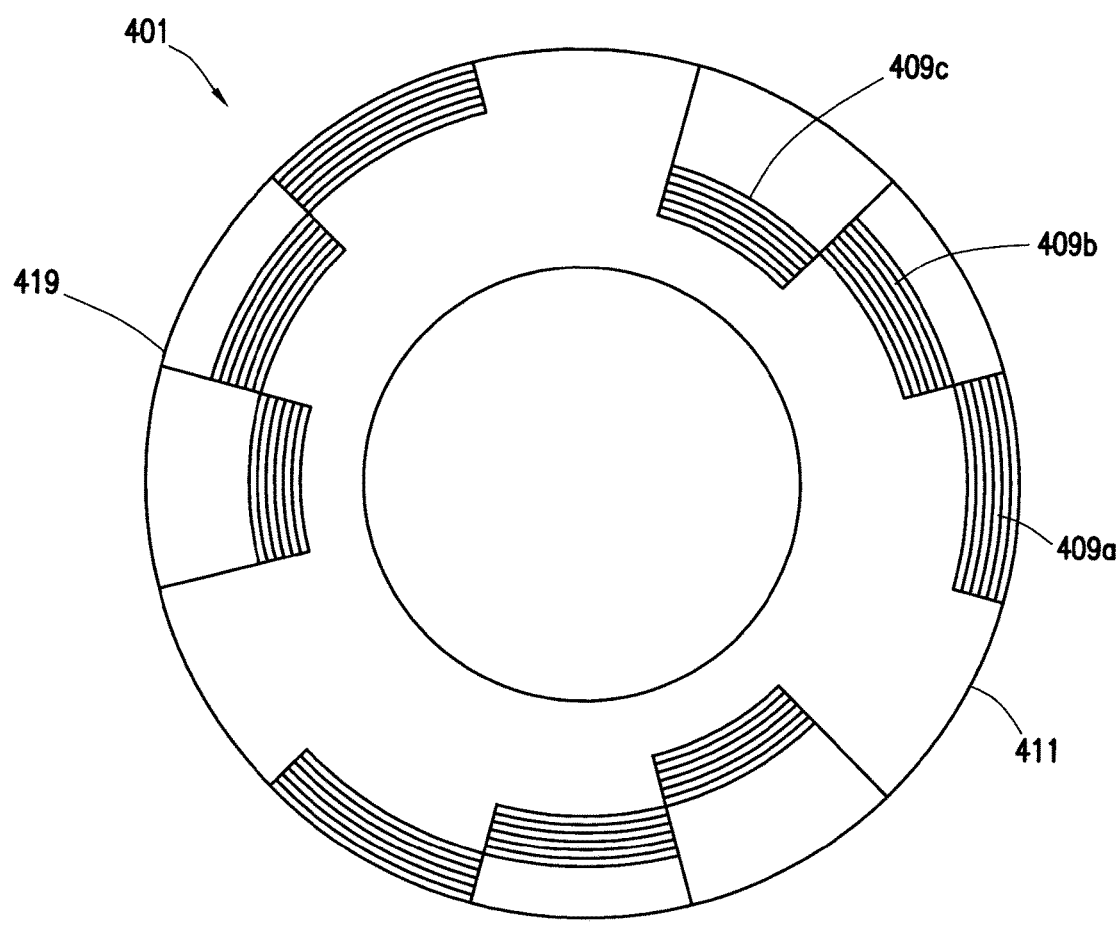
FIG. 9 is an elevation view of a stepped interrupted thread box consistent with embodiments of the present disclosure.
Figure 10:
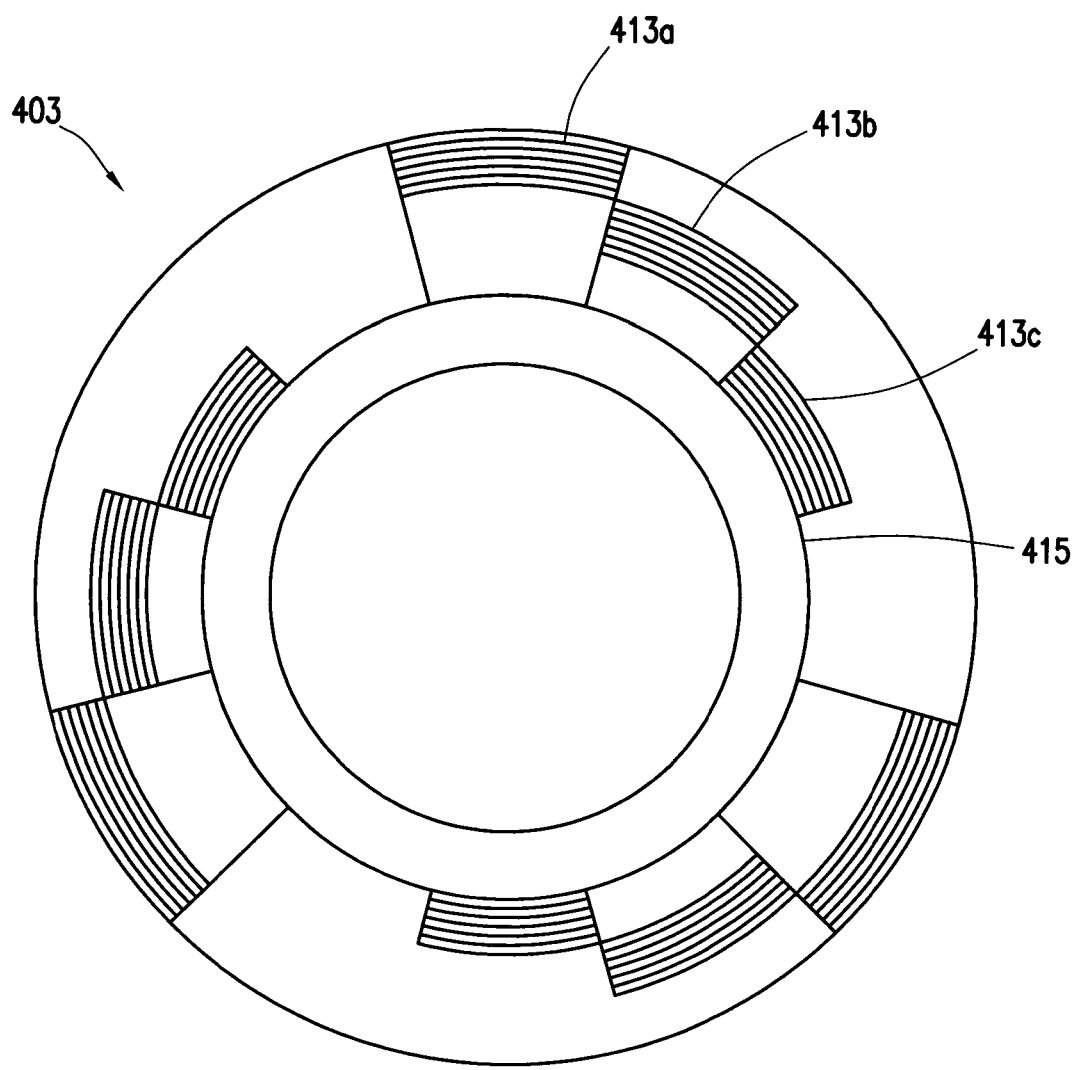
FIG. 10 is an elevation view of a stepped interrupted thread pin consistent with embodiments of the present disclosure.

In other embodiments, as depicted in FIGS. 9, 10, a stepped interrupted thread joint 400 is depicted. FIG. 9 depicts a stepped interrupted thread box 401, and FIG. 10 depicts a stepped interrupted thread pin 403. Stepped interrupted thread box 401 includes box threads 409a-c and box lands 411. Likewise, stepped interrupted thread pin 403 includes pin threads 413a-c and pin lands 415. Threads 409a-c and 413a-c may be separated from the outer diameter of the components. Thus, a stepped profile is formed. Pin thread 413a is aligned with box land 41, allowing stepped interrupted thread box and pin 401, 403 to mesh axially. When rotated, the correspondingly stepped box threads 409a-c and pin threads 413a-mesh respectively. Also, upon full rotation, each of box threads 409b-c abuts against a sidewall of pin threads 409 a-b, preventing overrotation in making stepped interrupted thread joint 400.

Figure 11:
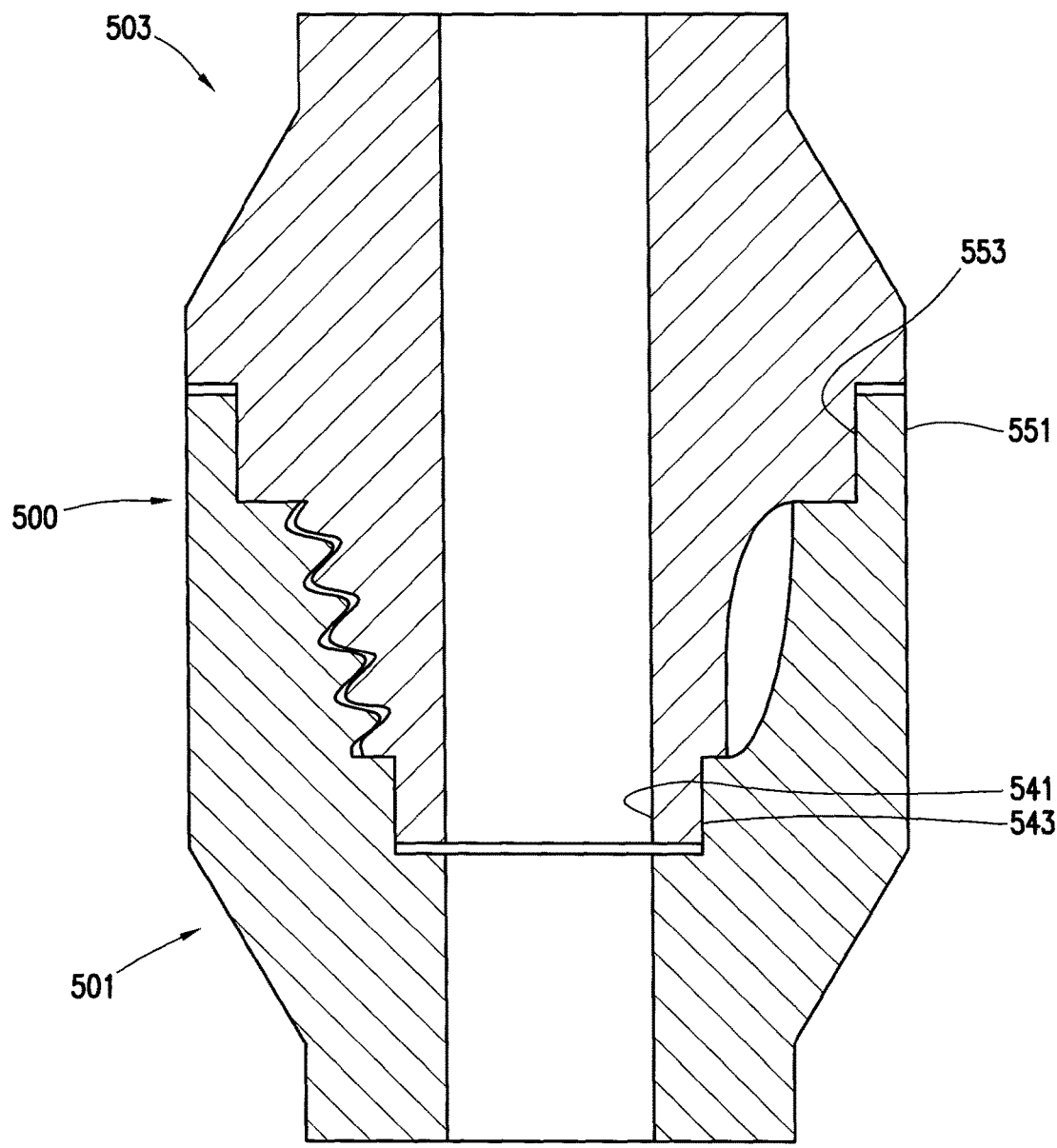
FIG. 11 is a partial cross section of an interrupted thread box and pin connection including inner and outer bushings consistent with embodiments of the present disclosure.

In some embodiments, in addition to the normal force exerted between adjacent shoulders, fluid sealing can be improved by the use of one or more bushings. In FIG. 11, for example, both an internal bushing 541 and external bushing 551 may be used in an interrupted thread joint 500. Internal bushing 541 is positioned to slide into a box counterbore 543 formed in the box 501. Internal bushing 541 is positioned as a cylindrical extension on pin 503. Likewise, external bushing 551 is positioned to slide around a necked down surface 553 of pin 503. External bushing 551 is formed as an extension of box 501. One having ordinary skill in the art with the benefit of this disclosure will understand that internal and external bushings can be used alone or in combination, and other geometries may be possible with, for example, internal bushings extending from the box, external bushings extending from the pin, etc. Furthermore, although not depicted, one or more seals may be positioned between the bushings and the surface to which they mate.

In some embodiments, not depicted, threads may include a tapered portion to, for example, allow alignment between box and pin threads after insertion at the beginning of rotation. The tapers may be asymmetrical to, for example, bias the box and pin to mate at the correct thread.

Figure 12:
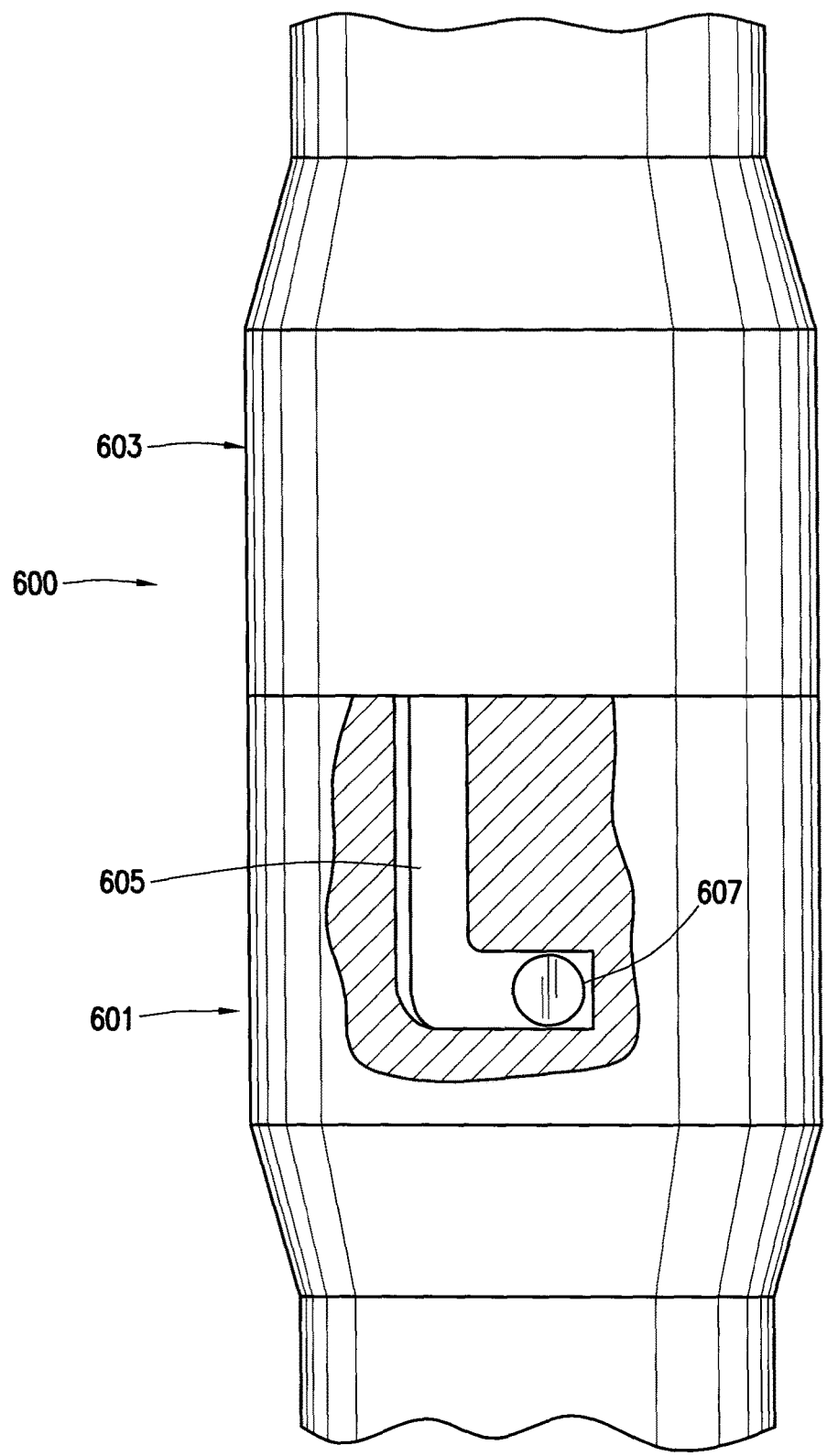
FIG. 12 is a perspective view of a twist lock box and pin consistent with embodiments of the present disclosure.

In some embodiments, rather than a threaded connection, a twist lock box and pin joint 600 as depicted in FIG. 12 may be implemented. In such an embodiment, a box 601 mates with a pin 603. Box 601 includes a locking path 605. Locking path 605 is positioned to accept a locking pin 607 attached to pin 603. In use, pin 603 is aligned so that locking pin 607 is aligned with locking path 605. Pin 603 is then inserted into box 601. Once locking pin 607 reaches the end of locking path 605, pin 603 is rotated to seat locking pin 607 in the horizontal portion of locking path 605, thereby preventing pin 603 from being removed from box 601. Although a simple path is depicted in FIG. 12, a more complex path may, for example, increase the torque required to lock pin 603 to box 601, and prevent rotational forces from disengaging pin 603 from box 601 during use.

Figure 13:
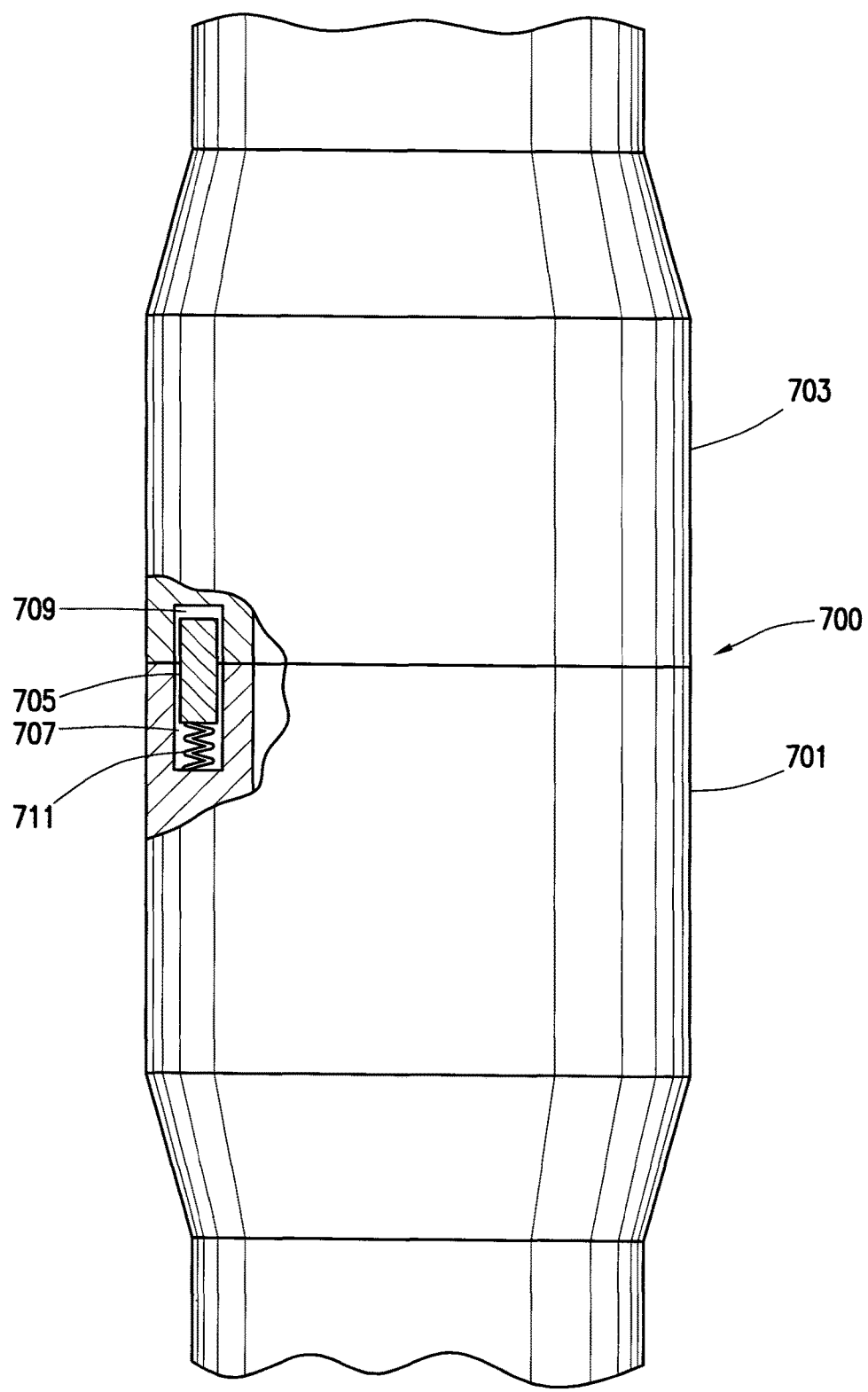
FIG. 13 is a perspective view of a box and pin joint with a locking pawl consistent with embodiments of the present disclosure.

In some embodiments, one or more locking features may be included in the pipe joint. For example, as depicted in FIG. 13, pipe joint 700 may include box 701 mating with pin 703 having one or more locking pawls 705 adapted to couple box 701 and pin 703 once fully engaged. As depicted in FIG. 13, locking pawl 705 may be a pin adapted to extend from a first cavity 707 formed in one side of the joint, depicted in FIG. 13 as box 701, into a second cavity 709 formed in the other side of pipe joing 700. In some embodiments, locking pawl 705 may be adapted to automatically extend into second cavity 709 when second cavity 709 is properly aligned with first cavity 707, corresponding to box 701 and pin 703 being fully engaged. One having ordinary skill in the art with the benefit of this disclosure will understand that box 701 and pin 703 may be engaged by any of the locking threads discussed herein. In some embodiments, locking pawl 705 may be adapted to be withdrawn from second cavity 709 at the time of disconnection of box 701 and pin 703. In some embodiments, locking pawl 705 may be adapted to be withdrawn manually by, for example and without limitation, a pawl retraction apparatus (not shown). In some embodiments, the pawl retraction apparatus may be actuated by a mechanical device such as a lever or button operatively coupled to locking pawl 705 to allow a user to retract locking pawl 705 from the exterior of the made up pipe joint 700. In some embodiments, the pawl retraction apparatus may be magnetically or electrically operated. In some embodiments, the mechanical apparatus may be automatically actuated by a power wrench or tong (not shown) used during a break-out operation of pipe joint 700. In some embodiments, multiple locking pawls 705 may be positioned about pipe joint 700. In some embodiments, locking pawls 705 may be located in both box 701 and pin 703, adapted to extend into pin 703 and box 701 respectively. In some embodiments, locking pawl 705 may be extended by spring 711. In some embodiments, locking pawl 705 may be extended by a locking pawl extension apparatus (not shown).

In some embodiments, not depicted, threads on either the box or the pin may include locking features, such as grooves, teeth, flats and lands, etc. positioned to prevent undesired disengagement between the box and the pin. In other embodiments, threads, though described as helical screw threads, may instead be splines designed to, for example, increase make up torque required and prevent undesired disengagement between the box and the pin.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A pipe joint for use in joining tubular members comprising:
 a box formed in an end of a first tubular member, the box formed in the interior surface of the first tubular member, the box including stepped internal threads and internal lands, the stepped internal threads positioned in radial segments, the stepped internal threads arranged in groups of a repeating pattern of thickness ascending order, the groups separated by the internal lands, the lands being generally cylindrical segments having inner diameter larger than the largest outer diameter of the largest thread; and
 a pin formed in an end of a second tubular member, the pin formed in the exterior surface of the second tubular member, the pin including stepped external threads and external lands, the stepped external threads positioned in radial segments, the stepped external threads arranged in groups of a repeating pattern of thickness ascending order, the groups separated by the external lands, the lands being generally cylindrical segments having outer diameter smaller than the smallest outer diameter of the smallest thread;
 the widths and positions of the largest stepped external threads of the pin positioned to correspond with those of the internal lands of the box, and the widths and positions of the external lands of the pin positioned to correspond with those of the largest stepped internal threads of the box when the box is inserted into the pin; and
 the stepped external threads of the box and the stepped internal threads of the pin positioned to mesh and tighten the box to the pin and provide a fluid seal between the first and second tubular member.

2. The pipe joint of claim 1, wherein the threads include a locking feature.

3. The pipe joint of claim 1, wherein the box further comprises an external bushing, the external bushing being a generally tubular extension of the first tubular member positioned to extend around a generally annular depression in the outer surface of the pin.

4. The pipe joint of claim 3, further comprising a seal between the external bushing and the pin.

5. The pipe joint of claim 1, wherein the pin further comprises an internal bushing, the internal bushing being a generally tubular extension of the second tubular member positioned to extend into a generally annular counterbore in the inner surface of the box.

6. The pipe joint of claim 5, further comprising a seal between the internal bushing and the box.

* * * * *